March 22, 1932. H. CHRISMAN ET AL 1,850,828
METER
Filed Aug. 26, 1927 4 Sheets-Sheet 2

Inventors
Horace Chrisman &
Nelson J. Seibert
By their Attorneys
Synnestvedt & Lechner

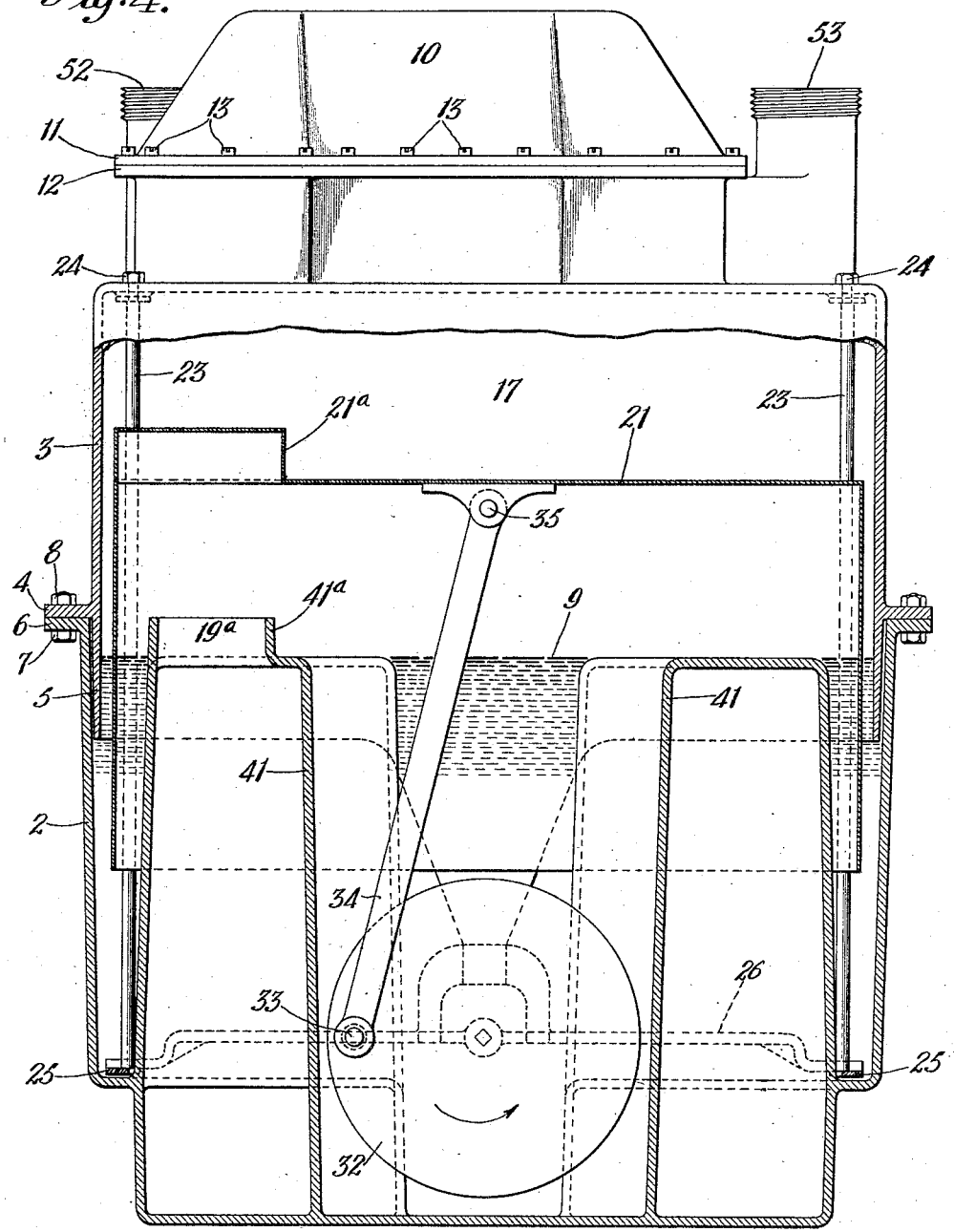

Patented Mar. 22, 1932

1,850,828

UNITED STATES PATENT OFFICE

HORACE CHRISMAN AND NELSON J. SEIBERT, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

METER

Application filed August 26, 1927. Serial No. 215,605.

Our invention relates to meters or measuring devices, and more particularly to fluid or gas meters of the wet or liquid-seal type.

Meters of this category, of large size to measure gas in quantity, have been subject to various limitations and disadvantages, among which may be mentioned: excessive weight of sealing liquid, which necessitates unduly heavy and expensive meter constructions and foundations therefore; large overall dimensions with the attendant crowding of available floor space and also high construction costs; inaccessibility of parts for inspection, adjustment and repair, which is due largely to the necessity for welded or soldered casing joints to prevent leakage; losses in pressure, and inaccuracy in measurement, arising from friction, or from changes in capacity due to displacement of the sealing liquid; and other troubles well known in the art.

We aim by our invention to obviate or reduce these difficulties, to insure accuracy of measurement, to prevent loss of the fluid being measured, to provide for ready access to and adjustment of the parts of the meter, and in general to reduce the size, weight and expense of large capacity meters and to increase their efficiency.

More specifically the invention contemplates the provision of a meter wherein the casing is made in readily separable parts, one of which contains the sealing liquid and certain passages and chambers, another of which contains co-operating passages and chambers and most of the moving parts of the meter, and still another of which houses and provides ready access to the valves and valve seats of the meter, and all of which with their contained parts co-operate to attain the desired results.

How the foregoing advantages, and such others as will occur to those skilled in the art or are incident to our invention, are obtained, will appear clearly hereinafter, reference being had to the accompanying drawings, in which:

Fig. 4 is a vertical view, partly in elevation and partly in section, taken on the line 4—4 of Fig. 1.

Construction

Figure 1:
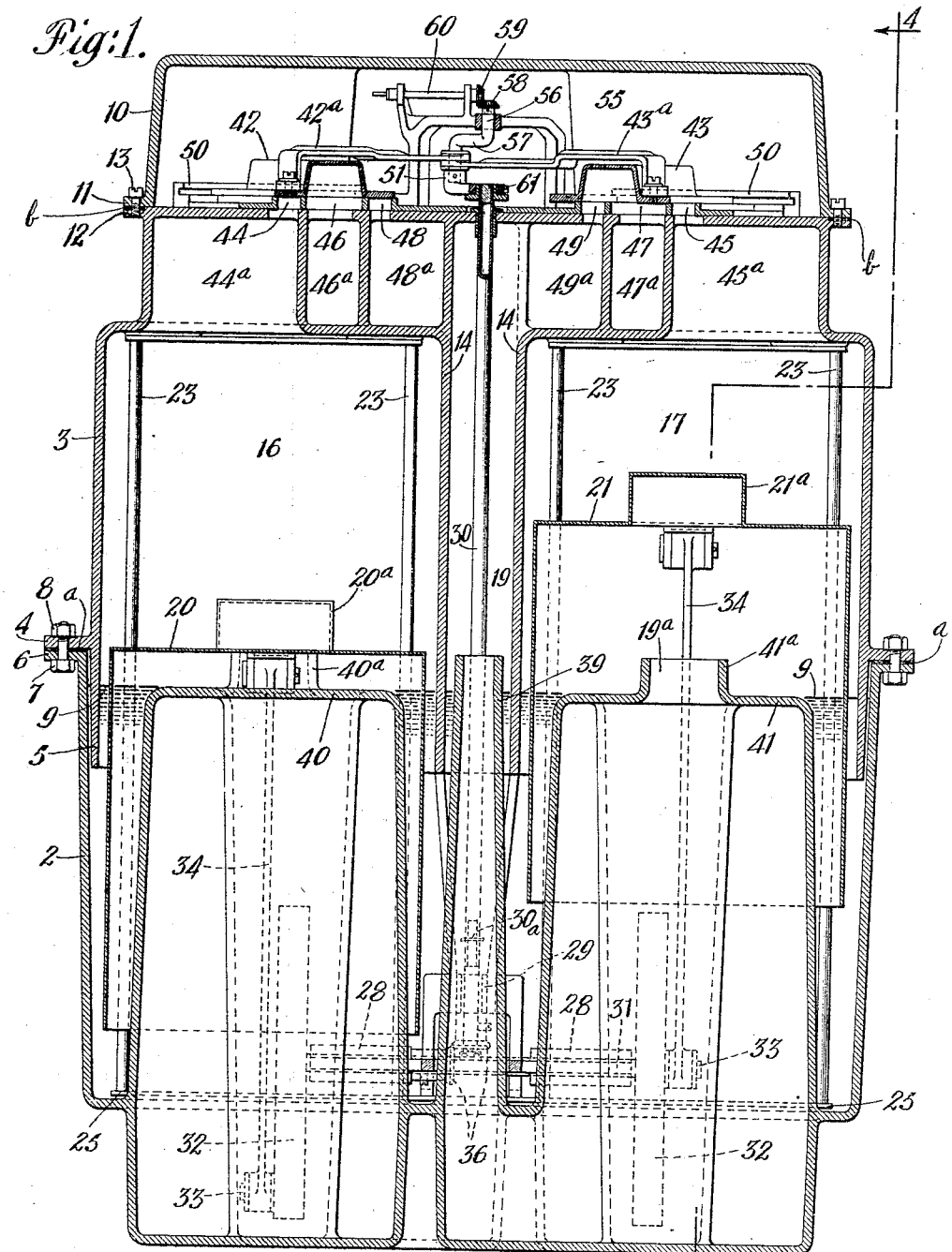
Fig. 1 is a vertical section through a meter embodying our invention. the view being taken on the line 1—1 of Fig. 2.

Referring to the drawings in general it will be seen that we have therein illustrated a gas meter having two main casing members, the lower member 2 being in general in the form of an open-top tank or housing, and the upper member 3 being in the form of a deep cover therefor. The cover part 3 is provided near the bottom with an external flange 4, the portion of the casing below such flange forming an inner lip or skirt 5. The flange 4 is adapted to form a joint with the flange 6 of the casing member 2 by means of suitable bolts and nuts 7, 8, and gasket $a$, while the lip 5, or upper casing extension, telescopes into casing member 2. The sealing liquid, the level of which is indicated at 9, thereby makes a gas-tight joint between the casing members.

A third casing member, 10, forming a separate and removable cover for the valves and certain other parts located at the top of casing member 3, has a flange 11 at the bottom, adapted to be secured to flange 12 of cover 3, as by screws 13, with a gasket $b$ between the flanges.

Figure 3:
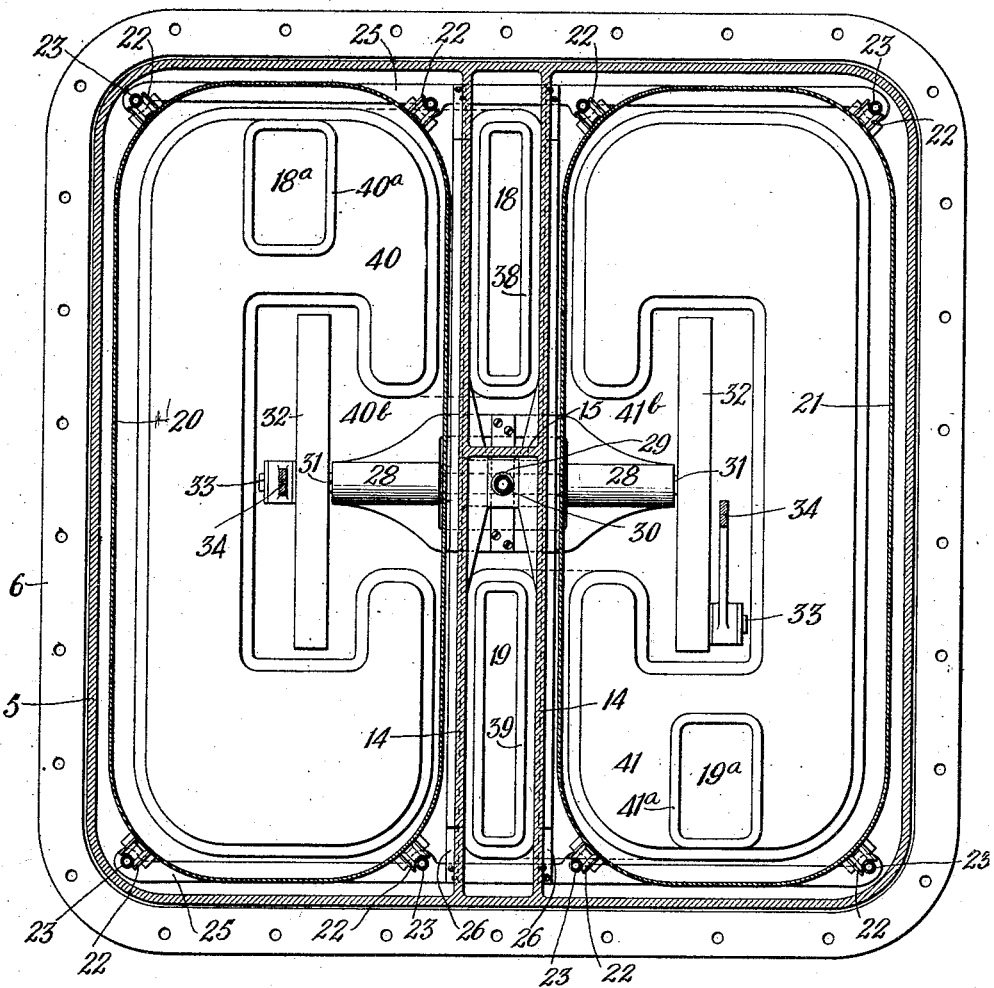
Fig. 3 is a horizontal section through Fig. 1 at the line of the flanged joint between the main upper and lower parts of the casing.

Referring now particularly to Figs. 1 and 3 it will be seen that cover member 3 has a pair of vertical internal webs or partitions 14, 14, with a cross-web 15 between them, forming two chambers 16, 17, and two gas passages 18, 19. Inverted gas-measuring cups or bells 20, 21, are adapted to reciprocate in the respective chambers 16, 17, and to maintain their alignment and reduce friction they are provided at their corners with rollers 22 which ride along vertical guide rods 23.

The guide rods 23 are secured at the top, as by nuts 24 (see Fig. 4), to cover 3, and serve as supports for the frame members or bars 25, which latter are positioned at the bottom of rods 23 and carry between them cross frame members 26. The frame carries a bearing 29 for the valve and register actuating shaft 30, and a pair of bearings 28 for the shaft 31. The shaft 31 has at each end a wheel 32 carrying a crank-pin 33 which is actuated by a connecting rod 34 pivoted at 35 inside the head of the respective measuring cup. Shaft 30, as shown in Fig. 1, is driven from shaft 31 through suitable bevel gears 36.

Casing or tank member 2, as will appear from Figs. 1, 3 and 4, has formed therein a pair of upstanding conduit-shaped webs or ribs 38 and 39 adapted respectively to telescope at their upper ends into the gas passages 18 and 19 formed by the webs in the cover member 3, thereby forming continuations of said passages 18, 19 to the bottom of the casing. The passage 18 communicates at the bottom with the inner shell 40 which has an upturned rim 40a extending above the surface 9 of the sealing liquid and forming a passage 18a opening beneath cup 20. Similarly passage 19 communicates with the shell 41 which has an up-turned rim 41a forming a passage 19a opening beneath cup 21. These shells 40 and 41, extending up from the bottom of casing member 2 are C-shaped when viewed in plan (as shown in Fig. 3), and not only form gas chambers, as above explained, for delivery and exhaust of gas to the inside of bells 20 and 21, but also form displacers for the sealing liquid so as to reduce the amount thereof required. Their C-formation provides spaces 40b, 41b, for the wheels 32, connecting rods 34, bearings 28 and 29, shaft 31 and gearing 36, which operate in the sealing liquid itself, which preferably consists of a good lubricating oil, non-freezing at temperatures such as the meter is ordinarily subjected to. As clearly shown in Figs. 1 and 4, the bells or cups 20, 21, may be provided with raised portions 20a, 21a, respectively, to permit the maximum down-stroke of the cups without interference with the up-turned rims 40a, 41a.

Figure 2:
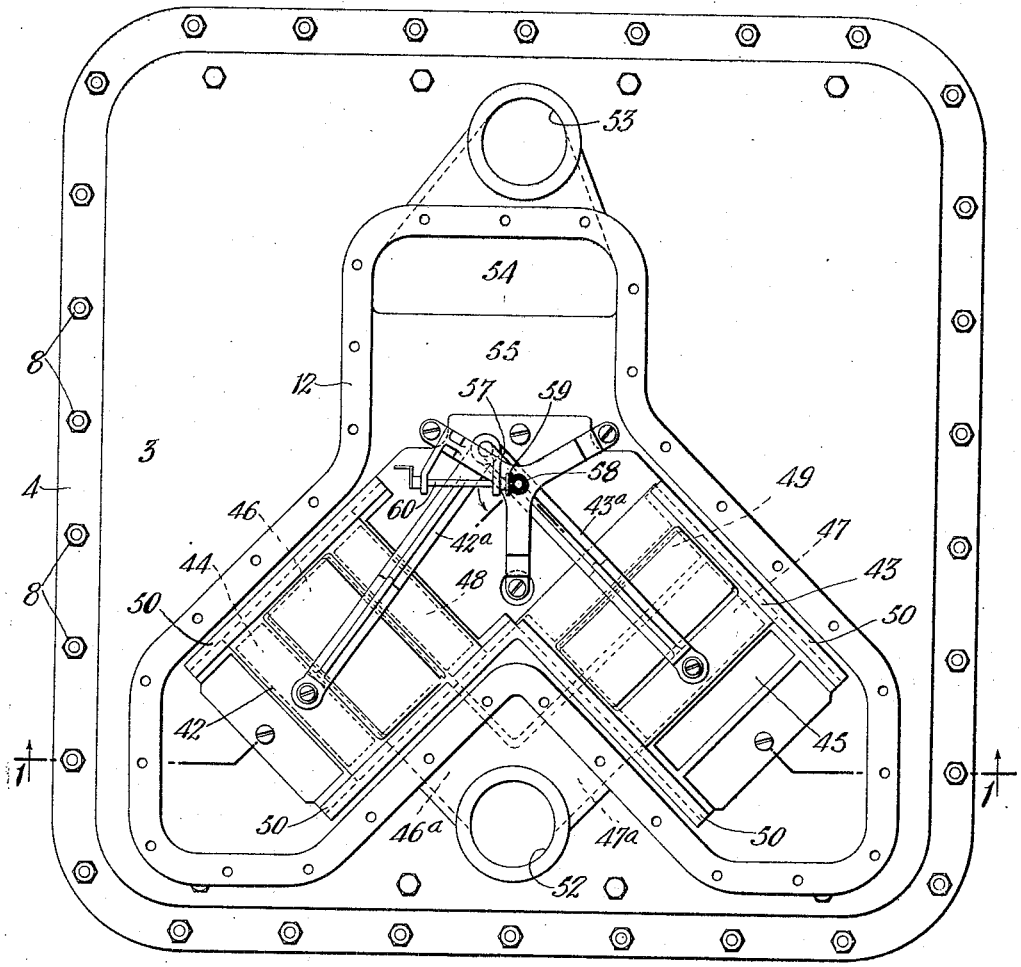
Fig. 2 is a plan view of the meter of Fig. 1, with a part of the casing removed to show certain of the valve parts.

At the top of cover member 3 we provide: on the upper side, a pair of valves, 42 and 43, preferably D-shape in cross section (see Figs. 1 and 2), respectively controlling ports 44, 46, 48, and 45, 47, 49; and on the lower side, passages 44a, 46a, 48a and 45a, 47a, 49a, these passages being preferably formed integral with the casing member 3.

Valves 42 and 43 are slidable in guides 50 and are actuated, respectively, by arms 42a and 43a connected to crank 51 on the upper end of shaft 30.

Passage 44a opens into the chamber 16 above the measuring cup 20, and passage 45a opens into chamber 17 above cup 21. Passage 49a communicates with the vertical gas passage 19, as shown in Fig. 1, and passage 48a similarly communicates with vertical passage 18 which is on the other side of the cross-web 15 shown in Fig. 3. Passages 46a and 47a communicate with the meter outlet 52 shown in Figs. 2 and 4. The meter inlet 53 communicates through a short vertical passage 54 with the gas space 55 enclosed by the casing member 10, which, as before pointed out is a separately removable cover to give access to the valves and associated parts.

Within the cover 10, above shaft 30, is a shaft 56 having a crank 57 actuated by crank 51, and carrying a bevel gear 58 adapted to drive, through gear 59 and shaft 60, any suitable fluid flow registering or recording mechanism. We have not illustrated such registering or recording mechanism, since it forms no part of the present invention, but it is obvious that it might be mounted either inside the cover 10, or outside of it, in which latter case a driving connection would extend from shaft 60 out through a suitable packing or stuffing box in the side or top of the cover.

The valve-actuating crank 51, it will be noted, is adjustably secured to shaft 30 by a set screw 61 so that the valves may be properly synchronized with the measuring cups. The shaft itself is provided with a slip-joint 30a to permit of the removal of the cover without removal of the main shaft and associated parts.

*Operation*

With the device in the position shown, the fluid to be metered passes from inlet 53 through passage 54 into chamber 55 from whence it passes through open port 45 and passage 45a into chamber 17 above measuring cup 21, the sealing liquid indicated at 9 preventing its escape. The pressure of this gas forces cup 21 downward, and at the same time the gas which had previously been admitted beneath the cup passes out through opening 19a into the interior of the shell 41 and from thence through passage 19, passage 49a, ports 49 and 47, and passage 47a to the meter outlet 52.

During this movement, connecting rod 34 of cup 21, as shown in Fig. 4, is turning the right-hand wheel 32 counterclockwise, as indicated by the arrow, which, through shaft 31, gears 36, shaft 30, crank members 51 and 57, shaft 56, gears 58 and 59, and shaft 60, actuates the register or recorder. The arms 42a and 43a are then moving valves 42 and 43 to close ports 45 and 49, and to open port 48 to chamber 55, and port 44 to port 46.

At the same time, the left-hand wheel 32, through its pin 33 (which is offset 90° with reference to right-hand pin 33), and connecting rod 34, starts the cup 20 upon its upward stroke, and as port 48 is opened, gas enters therethrough into passage 48a and from thence through passage 18 into the interior of shell 40, out through opening 40a into the interior of, or beneath, the cup 20, causing it to continue its upward movement. Gas previously admitted above the cup will then be passing out through passage 44a, ports 44 and 46, and passage 46a, to the meter outlet 52.

When cup 20 has risen half way, cup 21 will be at the bottom of its stroke, and as cup 21 begins to rise, port 45 will be put into communication with port 47, and port 49 with inlet chamber 55, and so on. In short, the cups or bells act as the pistons of a motor, and all the gas entering the meter must operate the measuring bells, the sealing liquid preventing any by-passing, and the register or recorder indicating accurately the amount passing.

It will now be seen that we have devised a meter of minimum weight by providing displacers for the sealing liquid, which also act as gas passages; that these displacers are shaped to provide space between them for the moving parts which run in a bath of oil; that the space on either side of the central vertical shaft and between the measuring cups is utilized for conveying the gas to and from the bottom of the meter; that all passages are inside the casing, instead of outside, thus conserving space and obviating leaks; that the lower casing member or tank, and the upper casing member or cover are formed respectively with upstanding and depending portions that may be likened to hollow stalagmites and stalactites, which telescope loosely at their ends, together forming the complete gas passages, with their overlapping parts sealed by the liquid contained in the bottom of the casing; that access to the parts may be had by lifting off the cover without disturbing the sealing liquid; that the lower shaft, wheels, cranks, etc., may be removed with the cover, or the cover separately removed after unscrewing the nuts 24 holding the frame, the shaft 30 being provided with a slip-joint 30a; that access to the valves and valve seats and to the crank-adjusting screw 61 may be had by the separate removal of the valve-chamber cover; and that accuracy of alignment of the cups and freedom from friction, with consequent accuracy of measurement, are obtained by means of guides and co-operating rollers.

We claim:—

1. In a meter, the combination of a split casing, one part of which is adapted to contain a sealing liquid, a frame in said part having means whereby it is supported on the other part of the casing, movable fluid-measuring bells supported by the frame and positioned to be sealed by the liquid, and means for admitting fluid alternately above and below said bells.

2. In a meter, the combination of a split casing, one part of which is adapted to contain a sealing liquid, a frame in said part having means whereby it is supported on the other part of the casing, movable fluid-measuring bells supported by the frame and positioned to be sealed by the liquid, and means for admitting fluid to said bells including gas passages opening above and below them.

3. In a meter, the combination of a split casing, one part of which is adapted to contain a sealing liquid, a frame in said part having means whereby it is supported on the other part of the casing, movable fluid-measuring bells supported by the frame and positioned to be sealed by the liquid, and means for delivering gas for operating said bells including gas pasages opening above and below them, and valve means controlling admission and exhaust of the gas.

4. In a meter, the combination of a split casing, one part of which is adapted to contain a sealing liquid, a frame in said part having means whereby it is supported on the other part of the casing; movable fluid-measuring bells supported by the frame and positioned to be sealed by the liquid, and means for delivering gas for operating said bells including gas passages opening above and below them, valve means controlling said passages, and actuating mechanism for the valves driven by the bells.

5. In a meter, the combination of a split casing, one part of which is adapted to contain a sealing liquid, a frame in said part having means whereby it is supported on the other part of the casing, movable fluid-measuring bells supported by the frame and positioned to be sealed by the liquid, and means for delivering gas for operating said bells including gas passages opening above and below them, valve means controlling said passages, and actuating mechanism for the valves driven by the bells, said actuating mechanism including adjustment means for synchronizing the movement of the bells and valve means.

6. In a meter, the combination of a split casing, one part of which is adapted to contain a sealing liquid, a frame in said part having means whereby it is supported on the other part of the casing, movable fluid-measuring bells supported by the frame and positioned to be sealed by the liquid, and means for delivering gas for operating said bells including gas passages opening above and below them, valve means controlling said passages, and actuating mechanism for the valves driven by the bells, said actuating mechanism being mounted in part on said frame and in part on the second-mentioned part of the casing.

7. In a meter of the character described, a tank member and a cover member forming a casing, a reciprocable measuring bell in said casing, a guiding and supporting frame secured to the cover member, and anti-friction means between the frame and the reciprocable bell, together with a meter drive shaft supported by the frame, and crank mechanism connecting the same with the bell, said cover being removable alone, or together with the frame, shaft, bell and crank mechanism, from the tank member.

8. A fluid meter comprising separable upper and lower housing members, a liquid sealing medium in the lower member, portions on the upper member projecting downwardly into the liquid, and portions on the lower member telescoping therewith and projecting above the level of the liquid, certain of said telescoping portions cooperating with each other to form passages for the fluid to be metered.

9. A fluid meter comprising separable upper and lower housing members, a liquid sealing medium in the lower member, portions on the upper member projecting downwardly into the liquid, and portions on the lower member telescoping therewith and projecting above the level of the liquid, certain of said telescoping portions cooperating with each other to form passages for the fluid to be metered, together with liquid displacing means in the lower member.

10. A fluid meter comprising separable upper and lower housing members, a liquid sealing medium in the lower member, portions on the upper member projecting downwardly into the liquid, and portions on the lower member telescoping therewith and projecting above the level of the liquid, certain of said telescoping portions cooperating with each other to form passages for the fluid to be metered, together with liquid displacing means in the lower member forming continuations of said passages.

11. In a gas meter, the combination of a lower member, a separable upper member, a liquid sealing medium in the lower member, a U-shaped gas passage in the lower member with its ends surrounded by and projecting above the surface of the liquid, one leg of the U being substantially enlarged to form a liquid displacing means, and a gas passage in the upper member projecting downwardly into the liquid to telescope with the other leg of the U.

12. In a gas meter, the combination of a lower member, a separable upper member, a liquid sealing medium in the lower member, a U-shaped gas passage in the lower member with its ends surrounded by and projecting above the surface of the liquid, one leg of the U being substantially enlarged to form a liquid displacing means, and a gas passage in the upper member projecting downwardly into the liquid to telescope with the other leg of the U, together with a reciprocable measuring cup adapted to telescope with said enlarged leg of the U.

13. In a gas meter, the combination of a lower member, a separable upper member, a liquid sealing medium in the lower member, a U-shaped gas passage in the lower member with its ends surrounded by and projecting above the surface of the liquid, one leg of the U being substantially enlarged to form a liquid displacing means, a gas passage in the upper member projecting downwardly into the liquid to telescope with the other leg of the U, a reciprocable measuring cup adapted to telescope with the enlarged leg of the U, valve mechanism for controlling the flow of the gas to be metered, operating mechanism connected to and actuated by the cup, and a driving shaft connecting said operating mechanism with the valve mechanism, said shaft extending through the gas passage in the upper member.

14. In a gas meter, the combination of a lower member, a separable upper member, a liquid sealing medium in the lower member, a reciprocable measuring cup projecting into the liquid, a valve above the cup, crank mechanism connected to the cup, a shaft connecting the valve with the crank mechanism, and means for hanging the cup and the crank mechanism from the upper member.

15. In a liquid seal meter, the combination of a gas chamber in the liquid, a gas passage communicating therewith and having an opening above the surface of the liquid, a valve chamber above the surface of the liquid and a second and separable gas passage connecting the valve chamber with said first gas passage, the lower end of said separable passage telescoping with the upper end of said first passage and projecting into the liquid.

16. In a liquid seal meter, the combination of an operating bell, a gas chamber having an opening above the surface of the liquid communicating with the interior of the bell, a gas passage communicating with said chamber and having an opening above the surface of the liquid, a valve chamber, and a second and separable gas passage connecting the valve chamber with said first gas passage, the connecting end thereof telescoping with the open end of said first passage and projecting into the liquid.

17. In a gas meter, the combination of a bottom casing member, a liquid sealing medium therein, an upper casing member having downwardly extending flange means projecting into the liquid, a pair of oppositely disposed liquid displacing chambers in the lower member with a comparatively narrow space therebetween, the adjacent walls of each chamber being formed to provide a recess in the chamber side, a gas passage leading from each of said chambers and projecting above the liquid, said passages being disposed in said space, corresponding gas passages in the upper member the lower ends of which project below the surface of the sealing liquid and telescope with the upper ends of the gas passages in the lower member, said upper passages being formed to divide the upper member into two chambers corresponding to the liquid displacing chambers in the lower member, an operating bell in each upper chamber the lower end of which projects into the liquid and surrounds the displacing chamber, an extension on each displacing chamber projecting above the surface of the liquid, said extension being formed to provide an opening above the liquid for establishing communication between each displaceing chamber and the space beneath its corresponding bell, gas supply and exhaust passages cooperating with said chambers and said telescoping gas passages, valve means for controlling said gas supply and exhaust passages, crank means in the recesses in said displacing chambers connected to and actuated by said bells, and a driving shaft connecting the crank means with the valve means, said crank means being located in the sealing liquid.

In testimony whereof we have hereunto signed our names.

HORACE CHRISMAN.
NELSON J. SEIBERT.